United States Patent
Larson et al.

(10) Patent No.: US 12,546,272 B1
(45) Date of Patent: Feb. 10, 2026

(54) SYSTEMS AND METHODS FOR HEAT RECOVERY FOR CARBON CAPTURE IN OIL AND NATURAL GAS SYSTEMS

(71) Applicant: EOG Resources, Inc., Houston, TX (US)

(72) Inventors: Roy Larson, San Antonio, TX (US); Michael James Kennedy, Fort Worth, TX (US); Janette Montalvo, Fort Worth, TX (US); Yang Du, Grapevine, TX (US); Paige Lorson, Fort Worth, TX (US); Nathan Gann, Fort Worth, TX (US); Jack L. Imboden, Weatherford, TX (US)

(73) Assignee: EOG RESOURCES, INC., Houston, TX (US)

( * ) Notice: Subject to any disclaimer, the term of this patent is extended or adjusted under 35 U.S.C. 154(b) by 0 days.

(21) Appl. No.: 19/019,781

(22) Filed: Jan. 14, 2025

Related U.S. Application Data

(60) Provisional application No. 63/621,153, filed on Jan. 16, 2024.

(51) Int. Cl.
*F02G 5/04* (2006.01)
*F01K 7/16* (2006.01)

(52) U.S. Cl.
CPC . *F02G 5/04* (2013.01); *F01K 7/16* (2013.01)

(58) Field of Classification Search
CPC .................................. F02G 5/04; F01K 7/16
See application file for complete search history.

(56) References Cited

U.S. PATENT DOCUMENTS

| | | | |
|---|---|---|---|
| 8,951,490 B2 | 2/2015 | Okumura et al. | |
| 9,180,401 B2 | 11/2015 | Hamad | |
| 9,371,755 B2 | 6/2016 | Hamad | |
| 9,581,062 B2 | 2/2017 | Hamad et al. | |
| 2017/0306825 A1 | 10/2017 | Kaneeda et al. | |
| 2022/0010707 A1 | 1/2022 | Sharma et al. | |
| 2024/0218838 A1* | 7/2024 | Woodall | F02C 9/20 |
| 2024/0360774 A1* | 10/2024 | Madukkakuzhy | F01K 23/06 |

* cited by examiner

*Primary Examiner* — Ngoc T Nguyen
(74) *Attorney, Agent, or Firm* — CONLEY ROSE, P.C.

(57) ABSTRACT

A system for carbon capture from engines includes a heat recovery steam generator that receives at least a portion of an exhaust from the engines and utilizes the exhaust to form steam. The system may include a steam turbine that utilizes at least a portion of the steam to generate electricity for the system. The system may include an absorption unit that receives the exhaust after the portion of the exhaust is utilized to heat the feedwater to form the steam and contacts the exhaust with a lean sorbent to cause carbon dioxide within the exhaust to be absorbed by the lean sorbent to form a rich sorbent and a carbon dioxide depleted stream. The system may include a desorption unit that receives the rich sorbent regenerates the lean sorbent utilizing heat from the steam.

20 Claims, 1 Drawing Sheet

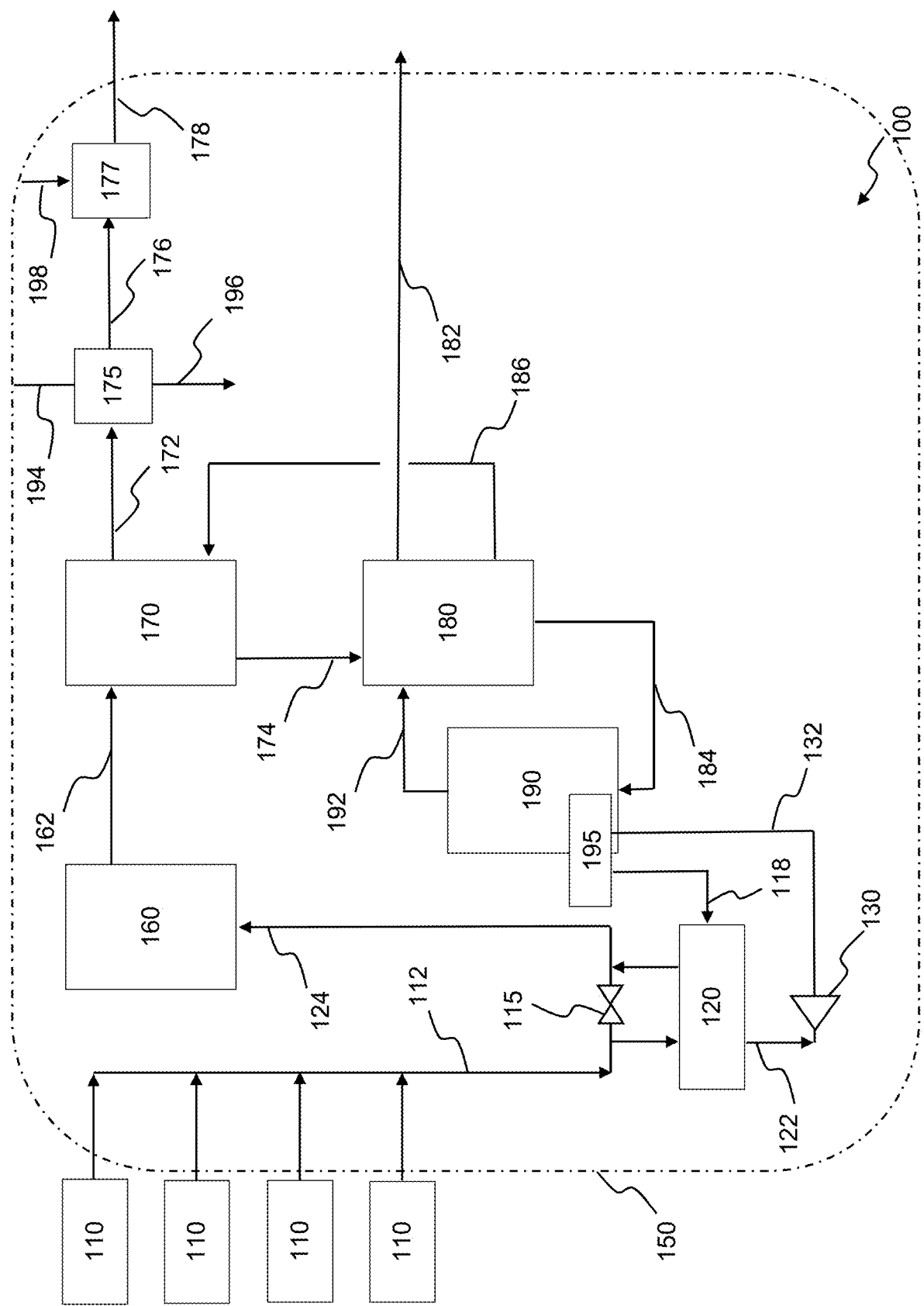

SYSTEMS AND METHODS FOR HEAT RECOVERY FOR CARBON CAPTURE IN OIL AND NATURAL GAS SYSTEMS

CROSS-REFERENCE TO RELATED APPLICATIONS

This application claims priority to U.S. Provisional Application Ser. No. 63/621,153 filed on Jan. 16, 2024 and entitled "SYSTEMS AND METHODS FOR HEAT RECOVERY FOR CARBON CAPTURE IN OIL AND NATURAL GAS SYSTEMS," which is hereby incorporated herein by reference in its entirety for all purposes.

STATEMENT REGARDING FEDERALLY SPONSORED RESEARCH OR DEVELOPMENT

Not applicable.

BACKGROUND

Various systems utilized in producing, extracting, transporting, and refining oil and natural gas often rely upon at least one internal combustion engine (ICE) to supply power for such processes. For example, compressors or compression "packages" or "compressor stations" are an example of a system for transporting natural gas from an upstream production area where the gas is produced to a downstream location where the natural gas may be refined prior to being consumed by an end-user. Compressor packages typically include one or more ICEs that provides power to one or more compressors that compress and pressurize the natural gas for transport, as well as other equipment disposed of the compressor station. Likewise, ICEs may be employed as a part of systems used to drill, stimulate, and/or complete a wellbore, to collect production fluids (for example, hydrocarbons such as oil and natural gas) from a wellbore, and/or to process and refine hydrocarbons.

ICEs are known to be a contributor to emissions of greenhouse gases such as carbon dioxide ($CO_2$) and methane ($CH_4$), for example, as a component of exhausting combustion gases. Additionally, methods and systems used to capture $CO_2$ may rely upon additional power inputs, thereby potentially contributing to the overall $CO_2$-containing combustion gases being exhausted.

As such, improved systems and processes for capturing $CO_2$ from combustion exhaust streams are needed.

BRIEF SUMMARY OF THE DISCLOSURE

Disclosed herein are one or more embodiments of a system for carbon capture from a plurality of internal combustion engines. The system may comprise a heat recovery steam generator configured to receive feedwater and at least a portion of an exhaust stream from the plurality of internal combustion engines and to utilize the exhaust stream to heat the feedwater to form steam. The system may also comprise a steam turbine configured to utilize at least a portion of the steam to generate electricity to supply power to equipment associated with the system. The system may also comprise an absorption unit configured to receive the exhaust stream after the portion of the exhaust stream is utilized to heat the feedwater to form the steam and to contact the exhaust stream with a lean sorbent under conditions suitable for carbon dioxide within the exhaust stream to be absorbed by the lean sorbent to form a rich sorbent and a carbon dioxide depleted stream. The system may also comprise a desorption unit configured to receive the rich sorbent from the absorption unit and to regenerate the lean sorbent utilizing heat from the at least a portion of the steam after the steam is utilized to generate electricity.

Also disclosed herein are one or more embodiments of a method for capturing carbon from a plurality of internal combustion engines. The method may comprise receiving, in a heat recovery steam generator, feedwater and at least a portion of an exhaust stream from the plurality of internal combustion engines. The method may also comprise utilizing at least a portion of the exhaust stream to heat the feedwater to form steam. The method may also comprise directing the steam to a steam turbine. The method may also comprise generating electricity utilizing the steam. The method may also comprise, after utilizing the portion of the exhaust stream to heat the feedwater to form the steam, directing the exhaust stream to an absorption unit. The method may also comprise contacting the exhaust stream with a lean sorbent under conditions suitable for carbon dioxide within the exhaust stream to be absorbed by the lean sorbent to form a rich sorbent and a carbon dioxide depleted stream. The method may also comprise directing the rich sorbent stream to a desorption unit. The method may also comprise regenerating the lean sorbent utilizing heat from at least a portion of the steam after the steam is utilized to generate electricity.

BRIEF DESCRIPTION OF THE DRAWINGS

For a detailed description of exemplary embodiments of the disclosure, reference will now be made to the accompanying drawings in which:

FIG. 1 is a schematic view of an embodiment of a carbon capture system in accordance with principles described herein.

DETAILED DESCRIPTION OF THE DISCLOSED EMBODIMENTS

The following discussion is directed to various exemplary embodiments. However, one skilled in the art will understand that the examples disclosed herein have broad application, and that the discussion of any embodiment is meant only to be exemplary of that embodiment, and not intended to suggest that the scope of the disclosure, including the claims, is limited to that embodiment.

Certain terms are used throughout the following description and claims to refer to particular features or components. As one skilled in the art will appreciate, different persons may refer to the same feature or component by different names. This document does not intend to distinguish between components or features that differ in name but not function. The drawing figures are not necessarily to scale. Certain features and components herein may be shown exaggerated in scale or in somewhat schematic form and some details of conventional elements may not be shown in interest of clarity and conciseness.

In the following discussion and in the claims, the terms "including" and "comprising" are used in an open-ended fashion, and thus should be interpreted to mean "including, but not limited to . . . " Also, the term "couple" or "couples" is intended to mean either an indirect or direct connection. Thus, if a first device couples to a second device, that connection may be through a direct connection, or through an indirect connection via other devices, components, and connections. In addition, as used herein, the terms "axial" and "axially" generally mean along or parallel to a central axis (e.g., the central axis of a body or a port), while the terms "radial" and "radially" generally mean perpendicular to the central axis. For instance, an axial distance refers to a distance measured along or parallel to the central axis, and a radial distance means a distance measured perpendicular to the central axis.

As described above, various systems that may be utilized in the production, extraction, transportation, and refinement of oil and natural gas often rely upon at least one ICE to supply power for such processes. Generally, disclosed herein are various embodiments in which waste heat from at least one ICE, which may be associated with oil and/or natural gas production, extraction, transportation, and refinement, is recovered and used to provide power to systems and processes for the capture of $CO_2$. As used herein, the term "carbon capture" is used to refer to the capture of $CO_2$ from a stream, for example, an exhaust stream from the ICE. In various embodiments as will be disclosed herein, an ICE may be a component of a various systems associated with the production, extraction, transportation, and refinement of oil and natural gas.

Referring now to FIG. 1, an embodiment of a carbon capture system 150 is shown. The carbon capture system 150 is illustrated as being disposed at a site 100. In various embodiments, the site 100 may be associated with various oil and/or natural gas production, extraction, transportation, or refinement equipment. For example, the site 100 may be the site of an oil and/or natural gas drilling, completion, and/or servicing (for example, stimulation) operation. Additionally or alternatively, the site 100 may be the site of oil and/or natural gas production and/or extraction, for example, an oil and/or gas well. Additionally or alternatively, the site 100 may associated with oil and/or gas transport. For example, the site 100 may comprise a compressor station. Additionally or alternatively, the site 100 may be associated with the refinement or processing of oil and/or natural gas, for example, an NGL plant.

As illustrated in FIG. 1, at least one ICE 110 may be disposed at the site 100. For example, in the embodiment of FIG. 1, the site is illustrated as including four (4) ICEs 110, although in various other embodiments a similar site may include one (1), two (2), three (3), five (5), six (6), seven (7), eight (8), nine (9), ten (10), 11, 12, 13, 14, 15, 16, 17, 18, 19, 20, or more ICEs 110. In various embodiments, the ICEs 110 may be configured to provide power to any suitable power need associated with the site 100. For example, the ICEs 110 may provide power for the operation of one or more pumps, compressors, blenders, mixing equipment, separation equipment, drilling equipment, stimulation equipment, or the like. The ICEs 110 may provide power directly, such as by providing rotational power to a pump or compressor, or indirectly, such as by providing power to a generator which may provide electrical power to a pump or compressor. In various embodiments, the ICE(s) may be a gasoline engine, diesel engine, a propane engine, natural gas engine, or combinations thereof.

As illustrated in FIG. 1, the carbon capture system 150 generally includes a heat recovery steam generator (HRSG) 120, a steam turbine system 130, an exhaust precooler 160, an absorption unit 170, a desorption unit 180, and a sorbent reboiler 190.

In some embodiments, the carbon capture system 150 may be generally configured such that the HRSG 120 receives an exhaust stream 112 from the ICEs 110. In various embodiments, the exhaust stream 112 may be characterized as having a temperature of at least about 500° F., additionally or alternatively, at least about 600° F., at least about 700° F., at least about 800° F., at least about 900° F., or from about 500° F. to about 1,200° F., or from about at least 600° F. to about 1,000° F., or from about 700° F. to about 900° F., or about 800° F. Also, in some embodiments that exhaust stream 112 may be characterized as having at least about 5% $CO_2$ by weight of the exhaust stream 112, additionally or alternatively, at least about 10% $CO_2$, at least about 15% $CO_2$, or from about 1% $CO_2$ to about 50% $CO_2$, or from about 5% $CO_2$ to about 20% $CO_2$.

In various embodiments, the exhaust stream 112 may include exhausts taken from any suitable number of ICEs. For example, in the embodiment of FIG. 1, the exhaust stream 112 is illustrated as being taken from four (4) ICEs 110, although in various other embodiments exhaust may be directed to the HRSG 120, as disclosed herein, from one (1), two (2), three (3), five (5), six (6), seven (7), eight (8), nine (9), ten (10), 11, 12, 13, 14, 15, 16, 17, 18, 19, 20, or more ICEs 110.

In some embodiments, a bypass valve 115 is configured to direct a desired portion of the exhaust stream 112 to the HRSG 120, for example, from 0% to 100% of the exhaust stream 112. In some embodiments, and not intending to be bound by theory, the bypass valve 115 may be operated so manipulate the pressure and/or flow-rate of the exhaust stream 112. Additionally or alternatively, the bypass valve 115 may be operated to direct a sufficient portion of the exhaust stream 112 to the HRSG 120 to obtain a desired heat transfer, as will also be discussed herein.

The HRSG 120 may generally be configured to transfer heat from a stream, for example, the exhaust stream 112 to a fluid, for example, water, thereby generating steam 122. Generally, the HRSG 120 may comprise a first flow path and a second flow generally configured to provide heat exchange between a fluid communicated via the first flow path and another fluid communicated via the second flow path. For example, the HRSG 120 may be configured to receive the exhaust stream 112 and communicate the exhaust stream 112 via the first flow path and, also, to receive feedwater 118 and communicate the feedwater 118 via the second flow path such that heat is transferred from the exhaust stream 112 to the feedwater 118 to form steam 122 via heat exchange.

In some embodiments, the first flow path may further comprise one or more duct burners. In such embodiments, the one or more duct burners may be disposed proximate to an inlet to the first flow path. In operation, the one or more duct burners may be supplied with a combustion gas in order to heat the exhaust stream 112, for example, allowing the exhaust stream 112 to provide additional heat for transfer to the feedwater 118 and/or steam 122.

Additionally or alternatively, in some embodiments, the HRSG 120 may comprise a auxiliary heater. Generally, the auxiliary heater may be configured to provide additional heat, in addition to the heat transferred to the feedwater 118 from the exhaust stream 112, to the feedwater 118 and/or steam 122. For example, in various embodiments, the HRSG 120 may further comprise one or more electrical elements. Additionally, in some embodiments, the auxiliary heater may be used to generate the steam 122 where insufficient heat is available from the exhaust (for example, during "start-up" or "shut-down" of the ICE(s) 110 and/or idle periods of the ICE(s)).

In various embodiments, the auxiliary heater may be disposed upstream of heat exchange between the feedwater 118 and the exhaust stream 112 (for example, such that the feedwater 118 is preheated prior to heat exchange with the exhaust stream 112), downstream of heat-exchange between the feedwater 118 and the exhaust stream 112 (for example, such that the steam 122 is further heated after heat exchange with the exhaust stream 112), and/or substantially adjacent to heat-exchange between the feedwater 118 and the exhaust stream 112 (for example, such that the feedwater 118 is further heated substantially contemporaneous with heat exchange with the exhaust stream 112).

In various embodiments, the steam 122 may be characterized as having a temperature of at least about 212° F., additionally or alternatively, at least about 250° F., at least about 300° F., at least about 350° F., at least about 400° F., or from about 212° F. to about 1,000° F., or from about at least 225° F. to about 800° F., or from about 250° F. to about 750° F. Also, in some embodiments, the steam 122 may be characterized as having a pressure of at least about 50 pounds per square inch absolute (psia), additionally or alternatively, at least about 100 psia, at least about 150 psia, at least about 200 psia, at least about 250 psia, at least about 300 psia, at least about 350 psia, at least about 400 psia, at least about 450 psia, at least about 500 psia, at least about 550 psia, at least about 600 psia, or from about 250 psia to about 800 psia, or from about 300 psia to about 750 psia, or from about 400 psia to about 700 psia.

In some embodiments, the steam 122 may be directed to the steam turbine system 130. The steam turbine system 130 may generally comprise one or more turbines, each configured to rotate about a shaft so as to provide power to a respective electrical generator. In operation, the steam 122 is directed to the steam turbine system 130 such that the steam 122 contacts turbine blades, causing the shaft to rotate and electricity to be generated. In some embodiments, the electricity generated via the operation of the steam turbine system 130 may be employed to supply power to various equipment associated with the carbon capture system 150, for example, to provide power for equipment which may include pumps, aerial cooler fans, chillers, compressors, blowers, heat pumps, and the like.

In various embodiments, the steam turbine system 130 may comprise any suitable type or configuration of the turbine. For example, in some embodiments, the steam turbine is or comprises a radial inflow turbine or a radial outflow. Not intending to be bound by theory, the use of a radial inflow turbine or radial outflow turbine may be effective to yield an efficiency of at least about 70%, additionally or alternatively, at least about 75%, or at least about 80%, or at least about 85%. In some embodiments, the radial inflow or outflow turbine may comprise one or more stages, for example, a single-stage or multi-stage turbine. By comparison, a partial admission axial flow turbine may, because of the geometry associated with the partial admission turbine, be capable of a maximum potential efficiency of about 50%. Again not intending to be bound by theory, the limited efficiency associated with a partial admission turbine causes the steam turbine to be unable to supply a significant amount of the electricity required for the operation of the carbon capture system 150. In some embodiments, the use of a steam turbine system 130 comprising a radial inflow turbine or radial outflow turbine may be effective in producing sufficient electricity to provide at least about 50% of the electrical power requirements associated with the carbon capture system 150, additionally or alternatively, at least about 55%, at least about 60%, at least about 65%, at least about 70%, at least about 75%, at least about 80%, at least about 85%, at least about 90%, at least about 95%, at least about 100% of the electrical power requirements associated with the carbon capture system 150. For example, in some embodiments, the electricity necessary to power the carbon capture system 150 can be supplied partially or fully by the waste heat from the exhaust stream 112 from the ICE(s) 110.

As the steam 122 passes through the steam turbine system 130, for example, imparting energy so as to generate electricity, the steam 122 may expand and/or cool to form an exhausted steam 132. In various embodiments, the exhausted steam 132 may be characterized as having a temperature of at least about 212° F., additionally or alternatively, at least about 250° F., at least about 300° F., at least about 350° F., at least about 400° F., or from about 212° F. to about 800° F., or from about at least 225° F. to about 750° F., or from about 250° F. to about 700° F. Also, in some embodiments that steam 122 may be characterized as having a pressure of least about 25 psia, additionally or alternatively, at least about 30 psia, at least about 35 psia, at least about 40 psia, at least about 45 psia, at least about 50 psia, at least about 55 psia, at least about 60 psia, or from about 25 psia to about 100 psia, or from about 30 psia to about 75 psia, or from about 40 psia to about 70 psia, or about 60 psia.

After exiting the steam turbine system 130, the exhausted steam 132 may be directed to the sorbent reboiler 190, for example and as will be disclosed herein, to provide heat to absorbent regeneration and thereby be cooled (e.g., condensed) to form the feedwater 118 before being returned to the HRSG 120.

Although FIG. 1 illustrates the transfer of heat from the exhaust stream 112 to the feedwater 118 via the HRSG 120 to generate steam 122, which can be used to provide power to the steam turbine system 130 to generate electricity, in some alternative embodiments, a carbon capture system may be configured to capture heat and transfer the heat to an organic heat transfer fluid via an organic Rankine cycle system. For example, in such embodiments, heat may be transferred to an organic fluid to volatilize the organic fluid to yield an organic vapor that can be used to power a turbine. Because the heat of vaporization of organic chemicals are significantly lower than the heat of vaporization of water-to steam, the flow rate to the turbine may provide higher efficiency.

Referring again to FIG. 1, a second exhaust stream 124 is formed from the exhaust stream 112, for example, from the portion of the exhaust stream 112 directed to the HRSG 120 such that heat is removed from the exhaust stream 112 together with the portion of the exhaust stream 112 that bypasses the HRSG 120 via the bypass valve 115. In various embodiments, the second exhaust stream 124 may be characterized as having a temperature of at least about 150° F., additionally or alternatively, at least about 200° F., at least about 250° F., at least about 275° F., at least about 300° F., or from about 200° F. to about 500° F., or from about at least 250° F. to about 400° F., or from about 275° F. to about 325° F., or about 300° F.

The second exhaust stream 124 may be directed to the exhaust precooler 160. Generally, the exhaust precooler 160 may be configured to cool the second exhaust stream 124 to form a cooled exhaust stream 162 prior to being directed to the absorption unit 170. The exhaust precooler 160 may have any configuration suitable for cooling the second exhaust stream 124 to form the cooled exhaust stream 162. For example, in some embodiments, the exhaust precooler 160 comprises a direct contact cooler, for example, by providing direct contact between the second exhaust stream 124 and another fluid, that is, a cooling fluid such as water or air. In various embodiments, for example, where the exhaust precooler 160 is configured as a direct contact cooler, the second exhaust stream 124 may be contacted with the cooling fluid at a mass ratio of from about 2:1 to 6:1 mass ratio of cooling fluid to exhaust of the second exhaust stream 124 to about, additionally or alternatively, a mass ratio of from about 1:1 to about 10:1. Additionally, in some embodiments the exhaust precooler may also be configured to reduce NOx compounds and/or $SO_x$ compounds, for example, by wet scrubbing. Additionally or alternatively, in some embodiments the exhaust precooler may comprise an aerial cooler configured to directly cool exhaust via heat exchange, such as through finned tubes. One or more evaporative coolers may cool the air through water evaporation before heat exchange with the second exhaust stream 124.

In various embodiments, the exhaust precooler 160 may be configured to cool the second exhaust stream 124 by at least about 50° F., additionally or alternatively, at least about 100° F., at least about 125° F., at least about 150° F., at least about 175° F., or at least about 200° F. For example, in various embodiments, the cooled exhaust stream 162 may be characterized as having a temperature of not more than about 250° F., additionally or alternatively, not more than about 200° F., not more than about 175° F., not more than about 150° F., not more than about 125° F., not more than about 100° F., or from about 50° F. to about 200° F., or from about at least 75° F. to about 150° F., or about 100° F.

The cooled exhaust stream 162 may be directed to the absorption unit 170. Generally, the absorption unit 170 may be configured to contact the cooled exhaust stream 162 with a lean sorbent stream 186 to form a rich sorbent stream 174 and a $CO_2$-depleted exhaust stream 172. For example, the exhaust precooler 160 may generally comprise a chamber configured to receive, for example, via two or more inlets, each of the cooled exhaust stream 162 and the lean sorbent stream 186. The chamber of the absorption unit 170 may, in some embodiments, be generally cylindrical or rectangular. In various embodiments, the absorption unit 170, for example the chamber, may have a cross-sectional flow-area of from about 1 $ft^2$ to about 3,000 $ft^2$, or from about 1.5 $ft^2$ to about 1,000 $ft^2$, about 2 $ft^2$ to about 500 $ft^2$, about 2.5 $ft^2$ to about 100 $ft^2$. In some embodiments, the absorption unit 170, for example the chamber, may be configured to improve contact between the cooled exhaust stream 162 and the lean sorbent stream 186. For example, the absorption unit 170 may comprise a packed bed, a fluidized bed, or trayed bed.

Additionally or alternatively, in some embodiments, a system like the system of FIG. 1 may further comprise a second, third, or fourth absorption unit like absorption unit 170. In such embodiments, the second, third, or fourth absorption units may be disposed in series, for example, so as to provide a relatively smaller overall size for each column while providing at least the same contact area.

The sorbent employed in the carbon capture system 150, for example, present in the lean sorbent stream 186 and the rich sorbent stream 174, may be any sorbent capable of absorbing and desorbing $CO_2$ under various temperature conditions, as will be disclosed herein. The sorbent may comprise an aqueous amine solution, for example, water and liquid amines, supported amines, and/or amine-functionalized particles such as metal-organic frameworks (MOFs) with amine-functionalized linking group(s). Examples of suitable amines include, but are not limited to, monoethanolamine (MEA), diethanolamine (DEA), methyldiethanolamine (MDEA), 2-Amino-2-methylpropanol (AMP), tetraethylenepentamine (TEPA), triethylenetetramine (TETA), pentaethylenehexamine, Piperazine (PIPA), 2-Methyl Piperazine (2MPZ), 1,3 diaminopropane, TriethanolAmine, (PEHA), polyethylenimine (PEI) (such as branched polyethylenimine (BPEI) and linear polyethylenimine (LPEI)), diglycolamine (DGA), diethanolamine (DEA), and di-isopropanolamine (DIPA), or combinations thereof. In embodiments where the amine is supported, the support material may be any suitable material, examples of which may include oxides, silicas, zeolites and nanomaterials such as carbon nanotubes. In various embodiments, the amine may be present in the aqueous amine solution in any suitable amount, for example, from about 20% to about 60% by weight of the aqueous amine solution. Additionally or alternatively, the sorbent may comprise an ionic liquid, an organic solvent, or combinations thereof. Examples of ionic liquids suitable for use as the sorbent include, but are not limited to, those ionic liquids comprising imidazolium, pyridinium, pyrrolidinium, phosphonium, or ammonium as the cation, and halogen, tetrafluoroborate, hexafluorophosphate, amino acid, or hydroxypyridinium as the anion, and combinations thereof. Examples, of organic solvents suitable for use as the sorbent include, but are not limited to, N-Methyl-2-pyrrolidone (NMP), 2-(2ethoxyethoxy) ethanol (CARBITOL™), glycols, glymes, and combinations thereof. Not intending to be bound by theory, the sorbent may be configured to absorb $CO_2$ under suitable absorption conditions (for example, a suitable absorption temperature) and to desorb $CO_2$ under suitable desorption conditions (for example, a suitable desorption temperature). As used herein, the term "rich sorbent" refers to the sorbent in a state in which $CO_2$ is substantially absorbed by the sorbent, for example, where $CO_2$ absorbed by the sorbent is at least about 25% of the theoretical absorption capacity of the absorbent, additionally or alternatively, where $CO_2$ absorbed by the sorbent is at least about 60%, or at least about 70%, or at least about 80%, or at least about 90% of the theoretical absorption capacity of the absorbent. Also, as used herein, the term "lean sorbent" refers to the sorbent in a state in which $CO_2$ is substantially desorbed from the sorbent, for example, where $CO_2$ absorbed by the sorbent is less than about 50% of the theoretical absorption capacity of the absorbent, additionally or alternatively, where $CO_2$ absorbed by the sorbent is less than about 40%, or less than about 30%, or less than about 20%, or less than about 10% of the theoretical absorption capacity of the absorbent.

In some embodiments, the absorption unit 170 may be maintained under conditions such that the contact within the absorption unit 170 between the cooled exhaust stream 162 and the lean sorbent stream 186 may be effective to cause $CO_2$ present within the cooled exhaust stream 162 to be absorbed by the lean sorbent stream 186, for example, by the sorbent. For example, in some embodiments, the absorption unit 170 may be maintained at a temperature of not more than about 200° F., additionally or alternatively, not more than about 175° F., not more than about 150° F., not more than about 125° F., not more than about 100° F., or from about 25° F. to about 150° F., or from about at least 50° F. to about 125° F., or from about 75° F. to about 100° F.

In some embodiments, the $CO_2$-depleted exhaust stream 172, for example, as formed by contacting the cooled exhaust stream 162 with the lean sorbent stream 186, may be characterized as having less than about 5% $CO_2$ by weight of the exhaust stream 112, additionally or alternatively, less than about 1.0% $CO_2$, less than about 0.5% $CO_2$, less than about 0.1% $CO_2$, or less than about 0.05% $CO_2$, or from about 0.01% $CO_2$ to about 5.0% $CO_2$, or from about 0.05% $CO_2$ to about 1.0% $CO_2$. The $CO_2$-depleted exhaust stream 172 may be exhausted to the atmosphere.

In some embodiments, the $CO_2$-depleted exhaust stream 172 may be subjected to one or more subsequent processing steps, for example, to remove various impurities and/or to recover inputs prior to be being exhausted. For example, referring to the embodiment of FIG. 1, the carbon capture system 150 further comprises each of a first water-wash 175 and a second water-wash 177. Although FIG. 1 illustrates the carbon capture system 150 as comprising both the first water-wash 175 and the second water-wash 177, in other embodiments a similar carbon capture system may include only a single water-wash or may include any other suitable sub-system.

In the embodiment of FIG. 1, the first water-wash 175 is configured to contact the $CO_2$-depleted exhaust stream 172 with a wash-water stream 194 so as to scrub amine from the $CO_2$-depleted exhaust stream 172 to yield an amine-depleted exhaust stream 176 and an amine-enriched wash stream 196. For example, in various embodiments, the first waster-wash 175 may be effective to remove substantial proportions of amine present in the $CO_2$-depleted exhaust stream 172 therefrom. For example, the amine-depleted exhaust stream 176 may be characterized as having amine-species present in an amount less than or equal to about 50% of the amine present in the $CO_2$-depleted exhaust stream 172, additionally or alternatively, less than or equal to about 40%, less than or equal to about 30%, less than or equal to about 20%, or less than or equal to about 10% of the amine present in the $CO_2$-depleted exhaust stream 172.

In the embodiment of FIG. 1, the amine-enriched wash stream 196 is directed to a carbon filter 173 in order to recover amine from the amine-enriched wash stream 196. In some embodiments, the recovered amine may be returned into the carbon capture system 150. In alternative embodiments, the amine-enriched wash stream 196 may be directed to disposal.

Also in the embodiment of FIG. 1, the second water-wash 177 is configured to contact the amine-depleted exhaust stream 176 with an amine-reactive species 198, examples or which include weak acids such as acetic acid. Generally, the amine-reactive species may react with any remaining amines present in the amine-depleted exhaust stream 176 to yield a clean exhaust 178.

In some embodiments, the rich sorbent stream 174 may be regenerated, for example, in the desorption unit 180 and sorbent reboiler. For example, as illustrated in the embodiment of FIG. 1, the rich sorbent stream 174 is directed to the desorption unit 180. Additionally or alternatively, in some embodiments the rich sorbent stream 174 may be directed to the sorbent reboiler 190. In some embodiments, the desorption unit 180 may be maintained under conditions such that the $CO_2$ absorbed by the sorbent may be desorbed so as to yield a $CO_2$ stream 182 and the lean sorbent stream 186. For example, in some embodiments, the absorption unit 170 may be maintained at a temperature of at least about 200° F., additionally or alternatively, at least about 225° F., at least about 250° F., at least about 275° F., at least about 300° F., or from about 225° F. to about 550° F., or from about at least 250° F. to about 500° F., or from about 275° F. to about 400° F.

In some embodiments, heat may be provided to the desorption unit 180 via the sorbent reboiler 190. For example, as illustrated in FIG. 1, a warm sorbent stream 184 may be directed from the desorption unit 180 to the sorbent reboiler 190 where the warm sorbent stream 184 is heated to form a hot sorbent stream 192 that is returned to the desorption unit 180, for example, such that the desorption unit 180 is maintained at a desired temperature range. In some embodiments, the sorbent reboiler 190 may be configured to transfer heat from the exhausted steam 132 to the warm sorbent stream 184. For example, in the embodiment of FIG. 1, the exhausted steam 132 is directed to one or more heat tubes 195 which are configured to transfer heat to the warm sorbent stream 184. In the heat tubes 195, the exhausted steam 132 may be condensed to form the feed-water 118, which may be returned to the HRSG 120.

Additionally or alternatively, in some embodiments, a system like the system of FIG. 1 may further comprise a second, third, or fourth desorption unit like desorption unit 180. In such embodiments, the second, third, or fourth desorption units may be disposed in series, for example, so as to provide a relatively smaller overall size for each column while providing at least the same area for desorption.

In some embodiments, the $CO_2$ stream 182, for example, resulting from desorption by the rich sorbent stream 174, may be characterized substantially pure $CO_2$, for example, at least 90% $CO_2$ by weight of the $CO_2$ stream 182, additionally or alternatively, at least 95% $CO_2$ by weight of the $CO_2$ stream 182, or at least 98% $CO_2$ by weight of the $CO_2$ stream 182, or at least 99% $CO_2$ by weight of the $CO_2$ stream 182. In various embodiments, the $CO_2$ stream 182 may be routed as suitable, for example, to storage for use or to sequestration.

In some embodiments, one or more components of the carbon capture system 150 comprises (for example, is formed from) spiral tubing. As used herein, "spiral tubing" refers to conduit formed from flattened strips (for example, of steel) that are formed into a cylinder by rolling the strips at an angle. In some embodiments, the adjacent edges may be attached, such as by welding, to form a spiral seam. In some embodiments, the carbon capture system 150 may be configured and/or operated such that various components of the carbon capture system 150 may be formed from spiral tubing. For example, in some embodiments the carbon capture system 150 may be configured and/or operated such that the pressure of various streams within the system do not exceed the allowable thresholds associated with spiral tubing. For example, in some embodiments, the conduits and/or components configured to transport various exhaust streams within the carbon capture system 150 may be configured to operate at about atmospheric pressure (for example, from about 10 psia to about 20 psia) and, also, to treat less than about 300,000 pounds per hour of exhaust, additionally or alternatively, less than about 275,000 pounds per hour of exhaust, or less than about 250,000 pounds per hour of exhaust.

For example, with reference to FIG. 1, the one or more of the conduit configured to transport the exhaust stream 112, the conduit configured to transport the second exhaust stream 124, the exhaust precooler 160, the conduit configured to transport the cooled exhaust stream 162, the absorption unit 170 (for example, the shell of the absorption unit 170), the conduit configured to transport the $CO_2$-depleted exhaust stream 172, the conduit configured to transport the rich sorbent stream 174, the desorption unit 180 (for example, the shell of the desorption unit 180), the conduit configured to transport the lean sorbent stream 186, the conduit configured to transport the warm sorbent stream 184, the conduit configured to transport the hot sorbent stream 192, the conduit configured to transport the $CO_2$ stream 182, or combinations thereof may be formed from spiral tubing. The use of spiral tubing for one or more of these components allows for significantly reduced construction costs over custom rolled shells or other shells constructed of seamed or seamless piping.

Certain additional embodiments of the subject matter disclosed herein are set forth herein below.

Embodiment 1 is a system for carbon capture from a plurality of internal combustion engines, the system comprising: a heat recovery steam generator configured to receive feedwater and at least a portion of an exhaust stream from the plurality of internal combustion engines and to utilize the exhaust stream to heat the feedwater to form steam; a steam turbine configured to utilize at least a portion of the steam to generate electricity to supply power to equipment associated with the system; an absorption unit configured to receive the exhaust stream after the portion of the exhaust stream is utilized to heat the feedwater to form the steam and to contact the exhaust stream with a lean sorbent under conditions suitable for carbon dioxide within the exhaust stream to be absorbed by the lean sorbent to form a rich sorbent and a carbon dioxide depleted stream; a desorption unit configured to receive the rich sorbent from the absorption unit and to regenerate the lean sorbent utilizing heat from the at least a portion of the steam after the steam is utilized to generate electricity.

Embodiment 2 is the system of embodiment 1, wherein the sorbent present in the lean sorbent and the rich sorbent comprises an aqueous amine solution, an ionic liquid, an organic solvent, or combinations thereof.

Embodiment 3 is the system of one of embodiments 1-2, further comprising a bypass valve configured to direct the portion of the exhaust stream to the heat recovery steam generator.

Embodiment 4 is the system of one of embodiments 1-3, wherein the heat recovery steam generator is configured to heat the feedwater to form the steam via heat exchange with the portion of the exhaust stream directed to the heat recovery steam generator.

Embodiment 5 is the system of one of embodiments 1-4, wherein the recovery steam generator comprises a duct burner.

Embodiment 6 is the system of one of embodiments 1-5, wherein the steam turbine is a radial inflow turbine or a radial outflow turbine.

Embodiment 7 is the system of one of embodiments 1-6, further comprising a precooler configured to cool the exhaust stream prior to the exhaust stream being received by the absorption unit.

Embodiment 8 is the system of one of embodiments 1-7, further comprising a sorbent reboiler configured to receive a warm sorbent from the desorption unit, to heat the warm sorbent with the heat from the steam to form a hot sorbent, and to return the hot sorbent to the desorption unit.

Embodiment 9 is the system of embodiment 8, wherein the sorbent reboiler comprises one or more heat tubes configured to receive the steam.

Embodiment 10 is the system of one of embodiments 1-9, wherein a conduit by which the exhaust stream is communicated is formed from spiral tubing.

Embodiment 11 is the system of one of embodiments 1-10, wherein the absorption unit, the desorption unit, or both is formed from spiral tubing.

Embodiment 12 is a method for capturing carbon from a plurality of internal combustion engines, the method comprising: receiving, in a heat recovery steam generator, feedwater and at least a portion of an exhaust stream from the plurality of internal combustion engines; utilizing at least a portion of the exhaust stream to heat the feedwater to form steam; directing the steam to a steam turbine; generating electricity utilizing the steam; after utilizing the portion of the exhaust stream to heat the feedwater to form the steam, directing the exhaust stream to an absorption unit; contacting the exhaust stream with a lean sorbent under conditions suitable for carbon dioxide within the exhaust stream to be absorbed by the lean sorbent to form a rich sorbent and a carbon dioxide depleted stream; directing the rich sorbent stream to a desorption unit; and regenerating the lean sorbent utilizing heat from at least a portion of the steam after the steam is utilized to generate electricity.

Embodiment 13 is the method of embodiment 12, wherein the sorbent present in the lean sorbent and the rich sorbent comprises an aqueous amine solution, an ionic liquid, an organic solvent, or combinations thereof.

Embodiment 14 is the method of one of embodiments 12-13, further comprising operating a bypass valve so as to direct the portion of the exhaust stream to the heat recovery steam generator.

Embodiment 15 is the method of one of embodiments 12-14, wherein the feedwater is heated, in the heat recovery steam generator, to form the steam via heat exchange with the portion of the exhaust stream directed to the heat recovery steam generator.

Embodiment 16 is the method of one of embodiments 12-15, further comprising heating the exhaust stream proximate to an inlet to the recovery steam generator via a duct burner.

Embodiment 17 is the method of one of embodiments 12-16, wherein the steam turbine is a radial inflow turbine or a radial outflow turbine.

Embodiment 18 is the method of one of embodiments 12-17, further comprising cooling, in a precooler, the exhaust stream prior to directing the exhaust stream to the absorption unit.

Embodiment 19 is the method of one of embodiments 12-18, wherein regenerating the lean sorbent comprises: directing a warm sorbent from the desorption unit to a sorbent reboiler; heating, in the sorbent reboiler, the warm sorbent with the heat from the steam to form a hot sorbent, and returning the hot sorbent to the desorption unit.

Embodiment 20 is the method of embodiment 19, wherein heating, in the sorbent reboiler, the warm sorbent comprises receiving the steam via one or more heat tubes of the sorbent reboiler.

Embodiment 21 is the method of one of embodiments 12-20, wherein a conduit by which the exhaust stream is communicated is formed from spiral tubing.

Embodiment 22 is the method of one of embodiments 12-21, wherein the absorption unit, the desorption unit, or both is formed from spiral tubing.

Embodiment 23 is the method of one of embodiments 12-22, further comprising powering at least one component associated with the heat recovery steam generator, the absorption unit, or the desorption unit with the electricity generated utilizing the steam.

While embodiments of the disclosure have been shown and described, modifications thereof can be made by one skilled in the art without departing from the scope or teachings herein. The embodiments described herein are exemplary only and are not limiting. Many variations and modifications of the systems, apparatus, and processes described herein are possible and are within the scope of the disclosure. For example, the relative dimensions of various parts, the materials from which the various parts are made, and other parameters can be varied. Accordingly, the scope of protection is not limited to the embodiments described herein, but is only limited by the claims that follow, the scope of which shall include all equivalents of the subject matter of the claims. Unless expressly stated otherwise, the steps in a method claim may be performed in any order. The recitation of identifiers such as (a), (b), (c) or (1), (2), (3) before steps in a method claim are not intended to and do not specify a particular order to the steps, but rather are used to simplify subsequent reference to such steps.

What is claimed is:

1. A system for carbon capture from a plurality of internal combustion engines, the system comprising:
   a heat recovery steam generator configured to receive feedwater and at least a portion of an exhaust stream from the plurality of internal combustion engines and to utilize the exhaust stream to heat the feedwater to form steam;
   a steam turbine configured to utilize at least a portion of the steam from the heat recovery steam generator to generate electricity to supply power to equipment associated with the system;
   an absorption unit configured to receive the exhaust stream after the portion of the exhaust stream is utilized to heat the feedwater to form the steam and to contact the exhaust stream with a lean sorbent under conditions suitable for carbon dioxide within the exhaust stream to be absorbed by the lean sorbent to form a rich sorbent and a carbon dioxide depleted stream; and
   a desorption unit configured to receive the rich sorbent from the absorption unit and to regenerate the lean sorbent utilizing heat from the at least a portion of the steam after the steam is utilized to generate electricity.

2. The system of claim 1, wherein the sorbent present in the lean sorbent and the rich sorbent comprises an aqueous amine solution, an ionic liquid, an organic solvent, or a combination thereof.

3. The system of claim 1, further comprising a bypass valve configured to direct the portion of the exhaust stream to the heat recovery steam generator.

4. The system of claim 1, wherein the heat recovery steam generator is configured to heat the feedwater to form the steam via heat exchange with the portion of the exhaust stream directed to the heat recovery steam generator.

5. The system of claim 1, wherein the recovery steam generator comprises a duct burner.

6. The system of claim 1, wherein the steam turbine is a radial inflow turbine or a radial outflow turbine.

7. The system of claim 1, further comprising a precooler configured to cool the exhaust stream prior to the exhaust stream being received by the absorption unit.

8. The system of claim 1, further comprising a sorbent reboiler configured to receive a warm sorbent from the desorption unit, to heat the warm sorbent with the heat from the steam to form a hot sorbent, and to return the hot sorbent to the desorption unit.

9. The system of claim 8, wherein the sorbent reboiler comprises one or more heat tubes configured to receive the steam.

10. The system of claim 1, wherein:
    a conduit by which the exhaust stream is communicated, the absorption unit, the desorption unit, or a combination thereof is formed from spiral tubing.

11. A method for capturing carbon from a plurality of internal combustion engines, the method comprising:
    receiving, in a heat recovery steam generator, feedwater and at least a portion of an exhaust stream from the plurality of internal combustion engines;
    utilizing at least a portion of the exhaust stream to heat the feedwater to form steam;
    directing the steam to a steam turbine;
    generating electricity utilizing the steam;
    after utilizing the portion of the exhaust stream to heat the feedwater to form the steam, directing the exhaust stream to an absorption unit;
    contacting the exhaust stream with a lean sorbent under conditions suitable for carbon dioxide within the exhaust stream to be absorbed by the lean sorbent to form a rich sorbent and a carbon dioxide depleted stream;
    directing the rich sorbent stream to a desorption unit; and
    regenerating the lean sorbent utilizing heat from at least a portion of the steam after the steam is utilized to generate electricity.

12. The method of claim 11, wherein the sorbent present in the lean sorbent and the rich sorbent comprises an aqueous amine solution, an ionic liquid, an organic solvent, or a combination thereof.

13. The method of claim 11, further comprising operating a bypass valve so as to direct the portion of the exhaust stream to the heat recovery steam generator.

14. The method of claim 11, wherein the feedwater is heated, in the heat recovery steam generator, to form the steam via heat exchange with the portion of the exhaust stream directed to the heat recovery steam generator.

15. The method of claim 11, further comprising heating the exhaust stream proximate to an inlet to the recovery steam generator via a duct burner.

16. The method of claim 11, wherein the steam turbine is a radial inflow turbine or a radial outflow turbine.

17. The method of claim 11, further comprising cooling, in a precooler, the exhaust stream prior to directing the exhaust stream to the absorption unit.

18. The method of claim 11, wherein regenerating the lean sorbent comprises:
    directing a warm sorbent from the desorption unit to a sorbent reboiler;
    heating, in the sorbent reboiler, the warm sorbent with the heat from the steam to form a hot sorbent; and
    returning the hot sorbent to the desorption unit.

19. The method of claim 18, wherein heating, in the sorbent reboiler, the warm sorbent comprises receiving the steam via one or more heat tubes of the sorbent reboiler.

20. The method of claim 11, further comprising powering at least one component associated with the heat recovery steam generator, the absorption unit, or the desorption unit with the electricity generated utilizing the steam.

* * * * *